United States Patent
Kong et al.

(10) Patent No.: US 9,232,417 B2
(45) Date of Patent: Jan. 5, 2016

(54) INTEGRATED REPEATER FOR INTEGRATEDLY RELAYING VARIOUS TYPES OF COMMUNICATION SIGNALS, AND INTEGRATED RELAY SYSTEM

(75) Inventors: Seok-Young Kong, Seoul (KR); Dong-Uk Park, Gyeonggi-do (KR); Seong-Hee Suh, Seoul (KR); Jae-Seon Jang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 302 days.

(21) Appl. No.: 13/696,281

(22) PCT Filed: Apr. 28, 2011

(86) PCT No.: PCT/KR2011/003155
§ 371 (c)(1),
(2), (4) Date: Nov. 5, 2012

(87) PCT Pub. No.: WO2011/139047
PCT Pub. Date: Nov. 10, 2011

(65) Prior Publication Data
US 2013/0044585 A1 Feb. 21, 2013

(30) Foreign Application Priority Data

May 3, 2010 (KR) .......................... 10-2010-0041361
May 3, 2010 (KR) .......................... 10-2010-0041362

(51) Int. Cl.
*H04B 3/36* (2006.01)
*H04B 10/29* (2013.01)
(Continued)

(52) U.S. Cl.
CPC ................. *H04W 24/04* (2013.01); *H04B 3/36* (2013.01); *H04B 7/155* (2013.01); *H04B 10/29* (2013.01)

(58) Field of Classification Search
CPC ...... H04B 10/29; H04B 3/36; H04B 7/15507; H04W 84/12; H04L 2001/0097
USPC .......... 370/465–467, 476, 535–539, 541, 542
See application file for complete search history.

(56) References Cited

U.S. PATENT DOCUMENTS 6,615,021 B1 * 9/2003 Lovinggood et al. ........ 455/11.1
7,684,435 B2 * 3/2010 Kim et al. ..................... 370/466

(Continued)

FOREIGN PATENT DOCUMENTS

KR  10-2008-0055379 A   6/2008
KR  10-2009-0096786 A   9/2009

(Continued)

*Primary Examiner* — Xavier Szewai Kong
(74) *Attorney, Agent, or Firm* — IP Legal Services, LLC

(57) ABSTRACT

The present invention relates to an integrated repeater and an integrated relay system. The integrated repeater of the present invention receives a signal from a main repeater for relaying signals transmitted from upper devices, and comprises a demultiplexer configured to demultiplex the multiplexed signal of an Ethernet signal and a mobile communication signal received from the main repeater, and separate the signals into the mobile communication signal and the Ethernet signal; a first converter configured to convert the mobile communication signal separated from the demultiplexer into a radio frequency (RF) signal, and transmit the converted RF signal; a second converter configured to convert the Ethernet signal separated from the demultiplexer into a wireless LAN signal, and transmit the converted wireless LAN signal; and a switching unit configured to deliver a signal received from the main repeater to either the demultiplexer or the second converter, depending on whether a fault of the mobile communication signal is generated.

10 Claims, 12 Drawing Sheets

(51) Int. Cl.
*H04B 7/155* (2006.01)
*H04W 24/04* (2009.01)

(56) References Cited

U.S. PATENT DOCUMENTS

| | | |
|---|---|---|
| 7,808,933 B2 | 10/2010 | Lee et al. |
| 8,032,916 B2* | 10/2011 | Oyadomari et al. .......... 725/119 |
| 2004/0004943 A1* | 1/2004 | Kim et al. ..................... 370/310 |
| 2004/0047581 A1 | 3/2004 | Tomino et al. |
| 2004/0224642 A1 | 11/2004 | Kim et al. |
| 2005/0100056 A1 | 5/2005 | Chuberre et al. |
| 2005/0265279 A1 | 12/2005 | Markovic et al. |
| 2005/0266854 A1* | 12/2005 | Niiho et al. ................... 455/445 |
| 2009/0103496 A1 | 4/2009 | Purkayastha et al. |
| 2009/0190515 A1 | 7/2009 | Finn et al. |
| 2011/0130163 A1* | 6/2011 | Saban et al. .................. 455/517 |
| 2012/0263099 A1 | 10/2012 | Lee et al. |
| 2013/0040557 A1* | 2/2013 | Shiizaki et al. ................... 455/7 |

FOREIGN PATENT DOCUMENTS

| | | |
|---|---|---|
| KR | 10-2009-0117074 A | 11/2009 |
| KR | 10-2009-0131055 A | 12/2009 |
| KR | 10-2010-0001686 A | 1/2010 |
| KR | 10-0950342 B1 | 3/2010 |

* cited by examiner

INTEGRATED REPEATER FOR INTEGRATEDLY RELAYING VARIOUS TYPES OF COMMUNICATION SIGNALS, AND INTEGRATED RELAY SYSTEM

CROSS REFERENCE TO RELATED APPLICATIONS

This application is a National Stage Patent Application of PCT International Patent Application No. PCT/KR2011/003155 (filed on Apr. 28, 2011) under 35 U.S.C. §371, which claims priority to Korean Patent Application Nos. 10-2010-0041361 (filed on May 3, 2010) and 10-2010-0041362 (filed on May 3, 2010), the teachings of which are incorporated herein in their entireties by reference.

TECHNICAL FIELD

The present invention relates to a repeater for relaying communication signals, more specifically to an integrated repeater and an integrated relay system for relaying various types of wireless/wired communication signals.

BACKGROUND ART

Recently, with the great development of electronics and telecommunication technologies, mobile communication terminals provide various functions, such as voice communication, internet access, video communication and the transmission of multimedia message. Also, as mobile communication terminals are propagating rapidly, most communications made between people are through mobile communication terminals, which have become a ubiquitous part of modern daily life.

Also, with the continuous development of mobile communication infrastructure, various kinds of mobile communication networks are currently provided, and even more advanced mobile communication networks are expected in the near future. The current mobile communication system includes a wideband CMDA (W-CDMA) system which is classified as a third generation mobile communication, and a mobile world interoperability for microwave access (WiMAX) system, e.g., IEEE 802.16e, which allows the use of high-speed internet service while mobile. Also, a wireless LAN (WLAN) service, e.g., Wi-Fi enabling ultra high-speed internet within a certain distance from an installed access point by way of notebook computers and such is provided.

In order to realize these various kinds of communication networks, a multi-band and multi-mode terminal has been developed. The multi-band and multi-mode terminal can access all communication networks having multi-bandwidth or at least two communication networks having different connection methods. That is, the multi-band and multi-mode terminal is an integrated device in which all communication modems corresponding to each communication network are provided.

In today's environment, where various kinds of communication services and terminals are provided, efforts are being made to provide customers with the best quality of service in the telecommunication industry. The most representative effort is to minimize a shadow area at which a communication signal is not properly transmitted. Such a communication drop in the shadow area has been overcome by installing an additional base station or a repeater therein. However, a base station has unbelievably high installation costs and is difficult to install in narrow places such as the underground and parking lots of a building. For this reason, repeaters are generally installed to provide better communication service in the shadow area.

However, as communication services are diversifying and a repeater is installed separately for each communication service, installation costs increase and damages the building appearance by the indiscriminate installation of the repeater.

DISCLOSURE

Technical Problem

The present invention is designed to solve the problems of the prior art, and therefore it is an object of the present invention to provide an integrated repeater and an integrated relay system for combining and relaying various types of communication signals to a shadow area.

Other objects and advantages of the present invention will be understood from the following descriptions and become more apparent from the embodiments of the present invention. Also, it will be understood that the objects and advantages of the present invention can be realized by means defined in the claims of the present invention and a combination thereof.

Technical Solution

In order to accomplish the above object, in accordance with one aspect of the present invention, there is provided an integrated repeater which receives a signal from a main repeater for relaying signals transmitted from upper devices, comprising a demultiplexer configured to demultiplex the multiplexed signal of an Ethernet signal and a mobile communication signal received from the main repeater, and separate the signals into the mobile communication signal and the Ethernet signal; a first converter configured to convert the mobile communication signal separated from the demultiplexer into a radio frequency (RF) signal, and transmit the converted RF signal; a second converter configured to convert the Ethernet signal separated from the demultiplexer into a wireless LAN signal, and transmit the converted wireless LAN signal; and a switching unit configured to deliver a signal received from the main repeater to either the demultiplexer or the second converter, depending on whether a fault of the mobile communication signal is generated.

In accordance with another aspect of the present invention, there is provided an integrated repeater for relaying a signal received from an upper device to a lower device, comprising a first receiver configured to receive a first mobile communication signal transmitted from a mobile communication base station which is the upper device; a second receiver configured to receive an Ethernet signal transmitted from an Ethernet equipment which is the upper device; a first multiplexer configured to multiplex the first mobile communication signal received from the first receiver and the Ethernet signal received from the second receiver; and a switching unit configured to be selectively connected to either the second receiver or the first multiplexer to deliver the signal output from the second receiver or the first multiplexer to the lower device, depending on whether a fault of the mobile communication signal is generated.

In accordance with another aspect of the present invention, there is provided an integrated relay system for the integrated relay of communication signals, comprising a main device configured to receive a mobile communication signal from a mobile communication base station and an Ethernet signal from an Ethernet equipment and transmit the multiplexed signal of the mobile communication signal and the Ethernet signal; and a plurality of termination devices configured to be connected to the main device to demultiplex the multiplexed signals transmitted from the main device, separate the signals into the mobile communication signal and the Ethernet signal and transmit the separated mobile communication signal and Ethernet signal to a communication terminal, wherein the main device comprises a first switching unit configured to select either the multiplexed signal or the Ethernet signal received from the Ethernet equipment, depending on whether a fault of the mobile communication signal is generated, and the plurality of termination devices comprise a second switching unit configured to allow the signal received from the first switching unit of the main device to be subject to a demultiplexing process or not.

Advantageous Effects

In accordance with the present invention, various kinds of communication signals can be relayed through an integrated relay system to a shadow area, thereby reducing costs necessary to install additional relay systems per every communication service and to produce additional relay systems. Also, since the relay system of the present invention is installed in an integrated form in a building, damages to the building appearance may be prevented.

BEST MODE

Other objects and aspects of the present invention will become apparent from the following descriptions of the embodiments with reference to the accompanying drawings, from which it will be deemed that a person having ordinary skill can easily practice the technical spirit of the present invention. Also, any explanation of the prior art known to relate to the present invention may be omitted if it is regarded to render the subject matter of the present invention vague.

Hereinafter, preferred embodiments of the present invention will be described in detail with reference to the accompanying drawings.

Figure 1:
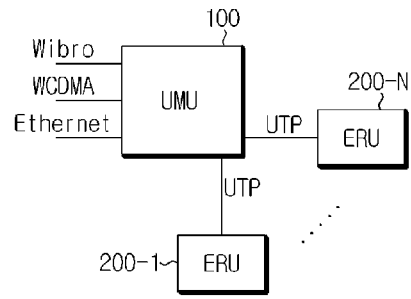
FIG. 1 shows a configuration of an integrated relay system according to one embodiment of the present invention.

FIG. 1 shows a configuration of an integrated relay system according to one embodiment of the present invention.

As shown in FIG. 1, the integrated relay system according to one embodiment of the present invention comprises a UTP master hub unit (UMU) 100 which is connected to an upper device such as a base station, and a plurality of expansion remote units (ERU) of 200-1 to 200-N which are termination devices installed inside a building and are connected to UMU 100 via an unshielded twisted pair (UTP) cable.

UMU 100, which is the main repeater of the integrated relay system, receives a mobile WiMAX signal (hereinafter, referred to as "WiBro signal") and a WCDMA signal in the form of a radio frequency (RF) signal from a base station or in the form of an optical signal from an optical repeater. Also, UMU 100 receives an analog Ethernet signal from an external fast ethernet switch (FES). UMU 100 multiplexes the received WiBro signal, WCDMA signal and Ethernet signal to transmit through the UTP cable to the plurality of the ERU of 200-1 to 200-N which are present in a remote distance.

Also, UMU 100 demultiplexes the multiplexed signal of the WiBro signal, WCDMA signal and Ethernet signal received from the termination device, ERU of 200-1 to 200-N and transmits the demultiplexed signals to the upper device. Similar to the receipt of a signal, UMU 100 may transmit the WiBro signal and WCDMA signal received from the ERU of 200-1 to 200-N in the form of a RF signal to the base station or in the form of an optical signal through an optical repeater.

The UTP cable is essentially installed in the early construction of various buildings for residence, office, public facilities and the like. Particularly, with the trend of modern-style automated buildings, such buildings are generally designed so that the UTP cable is used as a distribution system. The integrated relay system of the present invention is to relay a communication signal by using such a UTP cable which is essentially installed in various buildings, thereby reducing costs for the construction of a system.

Figure 2:
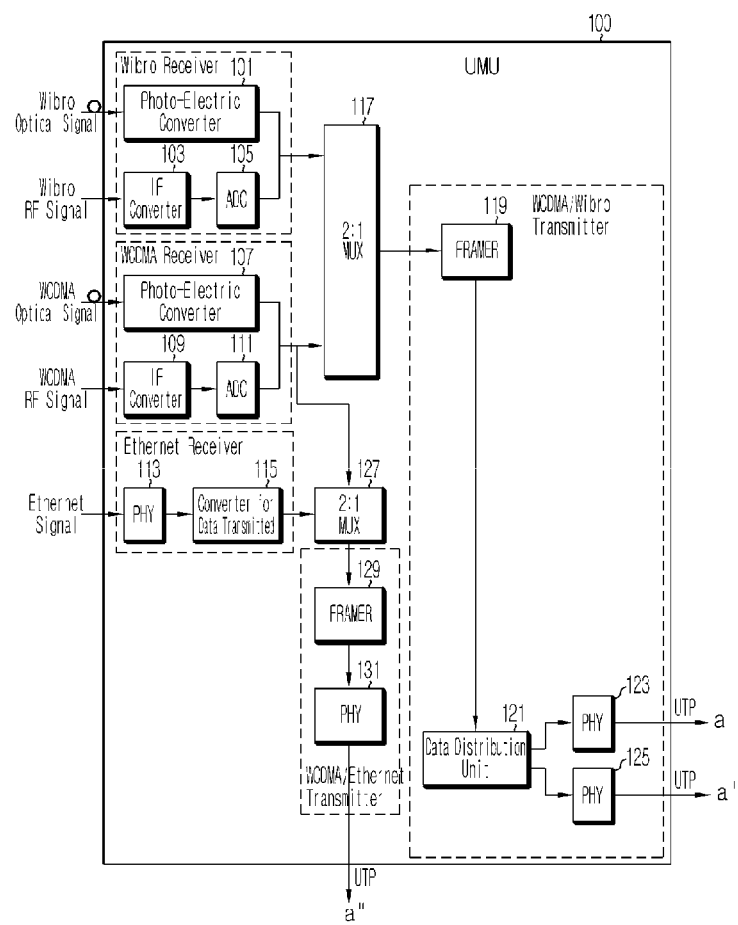
FIG. 2 shows a configuration of the UMU of the integrated relay system shown in FIG. 1.
Figure 3:
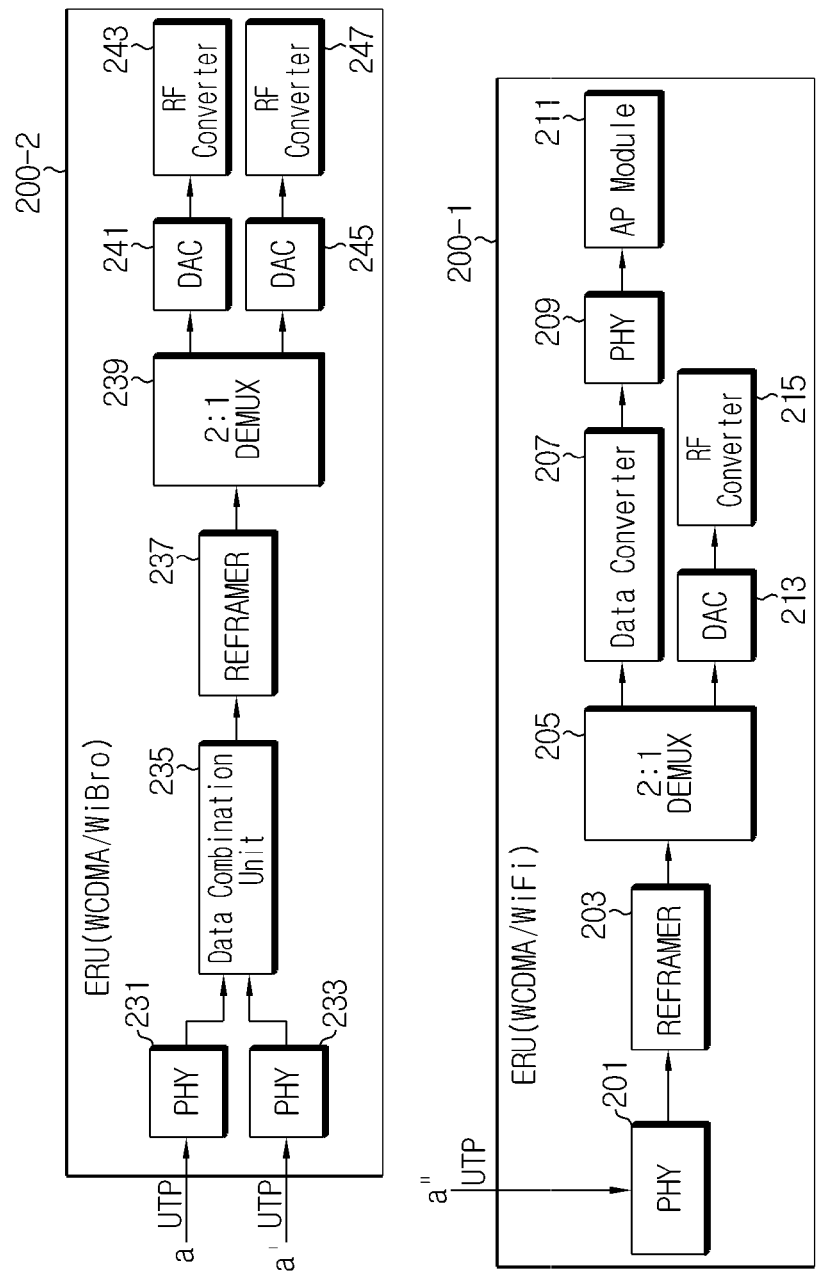
FIG. 3 shows a configuration of the ERU of the integrated relay system shown in FIG. 1.

FIG. 2 shows a configuration of the UMU of the integrated relay system shown in FIG. 1, and FIG. 3 shows a configuration of the ERU of the integrated relay system shown in FIG. 1, where both show a process of a forward signal.

Referring to FIG. 2, UMU 100 comprises a WiBro receiver configured to receive a WiBro signal, and the WiBro receiver comprises a photo-electric converter 101, an IF converter 103 and an analog-digital converter (ADC) 105. The photo-electric converter 101 converts a signal of a WiBro base station, which is received as an optical signal through an optical repeater and an optical cable, into an electric digital signal through a photo diode (PD) and outputs the signal. The forward signal which is output through the photo-electric converter 101 is a 50 MHz/14 bit signal. Also, the signal of the WiBro base station may be directly received in the form of a RF signal, and the RF signal is frequency down-converted through IF converter 103 and converted into a digital signal of 50 MHz/14 bit through ADC 105 before the output thereof.

In addition, UMU 100 comprises a WCDMA receiver configured to receive a WCDMA signal, and the WCDMA receiver comprises a photo-electric converter 107, an IF converter 109 and an ADC receiver 111, similar to the WiBro receiver. The photo-electric converter 107 converts a signal of a WiBro base station, which is received as an optical signal through an optical repeater, into an electric digital signal through a photo diode (PD) and outputs the signal. The forward signal which is output through the photo-electric converter 107 is a 50 MHz/14 bit signal. Also, the signal of the WiBro base station may be directly received in the form of a RF signal, and the RF signal is frequency down-converted through IF converter 109 and converted into a digital signal of 50 MHz/14 bit through ADC 111 before the output thereof.

Also, UMU 100 comprises an Ethernet receiver configured to receive an Ethernet signal, and the Ethernet receiver comprises a physical chip (PHY) 113 and a converter 115 for data transmitted. PHY 113 receives a 100 Mbps of analog Ethernet signal from an external fast Ethernet switch (FES) and converts the signal into a digital signal. It is required that the Ethernet signal converts into a 50 MHz signal for the multiplexing with a 50 MHz WCDMA signal. The signal used above is a reduced media independent interface (RMII) signal among interface signals between the Ethernet physical interface and an Ethernet controller, and the RMII signal output from PHY 113, which is a 25 MHz/1 bit signal, is converted into a 50 MHz/2 bit signal in the converter 115 for data transmitted and output to a multiplexer 127.

The WiBro signal, WCDMA signal and Ethernet signal thus received are multiplexed and transmitted through the UTP cable to the lower device, ERU of 200-1 to 200-N. The specific transmission procedure is shown in FIG. 2.

Referring to FIG. 2, UMU 100 comprises a multiplexer (MUX) 117 configured to multiplex a WiBro signal and a WCDMA signal, and a multiplexer (MUX) 127 configured to multiplex a WCDMA signal and an Ethernet signal.

First, a WiBro digital signal output from a WiBro receiver and a WCDMA digital signal output from a WCDMA receiver are multiplexed to one signal in MUX 117. The multiplexed signal output from MUX 117 is a 50 MHz/28 bit signal, and it is framed in a gigabit transmission format in a framer 119. At this time, a gigabit UTP cable may be used to allow a data transmission less than 1 Gbps for one line. Accordingly, a data distributor 121 divides a frame output from the framer 119 into two, and two physical chips 123 and 125 transmits two frames divided in the data distributor 121 to the lower ERU 200-2, respectively.

Next, a WCDMA digital signal output from a WCDMA receiver and an Ethernet digital signal output from an Ethernet receiver are multiplexed to one signal in MUX 127. The multiplexed signal output from MUX 127 is a 50 MHz/16 bit signal. As mentioned above, the signals output from the WCDMA receiver and the Ethernet receiver are identically set to 50 MHz and thus multiplexed without a complex signal conversion, from which it is possible to avoid the influence of a time delay and the complexity of logic. The signal output from MUX 127 is framed to a 125 MHz/8 bit signal in a framer 129, and the signal output from the framer 129 is converted into a gigabit Ethernet signal through a gigabit physical chip 131 and transmitted to the lower ERU 200-1.

Referring to FIG. 3, the signal which is multiplexed in the UMU 100 of FIG. 2 and output therefrom is transmitted through the UTP cable to the lower ERU 200-1, 200-2. In FIG. 3, ERU 200-1 is for a WCDMA/WiFi, and ERU(200-2), for a WCDMA/WiBro.

The ERU 200-1 which is for a WCDMA/WiFi comprises a physical chip 201, a reframer 203, a demultiplexer (DEMUX) 205, a data converter 207, a physical chip 209, an access point (AP) module 211, a digital-analog converter (DAC) 213 and a RF converter 215. Specifically, the multiplexed signal of a WCDMA signal and an Ethernet signal, which is transmitted from UMU 100, is received through a UTP cable to the physical chip 201 in which the received signal is converted into a 125 MHz/8 bit signal. The signal converted in the physical chip 201 is reframed into a 50 MHz/16 bit signal in a reframer 203. The signal output from the reframer 203 is separated into a 50 MHz/14 bit WCDMA digital signal and a 50 MHz/2 bit Ethernet digital signal in DEMUX 205. Among the signals separated in DEMUX 205, the WCDMA signal is converted into an analog signal in DAC 213 and frequency up-converted into a RF signal in RF converter 215 and then transmitted to a user terminal. Among the signals separated in DEMUX 205, the Ethernet signal is converted into a 25 MHz/1 bit signal in data converter 207, passed through the physical chip 209 to be applied to AP 211, and transmitted to a user terminal having a wireless LAN depending on a WiFi standard.

Also, ERU(200-2) which is for a WCDMA/WiBro comprises two physical chips 231 and 233, a data combination unit 235, a reframer 237, DEMUX 239, DACs 241 and 245, and RF converters 243 and 247. Specifically, the multiplexed signal of a WCDMA signal and a WiBro signal, which is transmitted from UMU 100, is received as two UTP signals, and the two UTP signals are converted into digital signals in two physical chips 231 and 233. The digital signal output from the physical chips 231 and 233 are combined in the data combination unit 235 to form one digital signal, and the combined digital signal is reframed in the reframer 237 and then output. The signal output from the reframer 237 is separated into a WCDMA signal and a WiBro signal in DEMUX 239, and each signal is converted into an analog signal in DACs 241 and 245 and frequency up-converted into a RF signal in RF converters 243 and 247, and then transmitted to each of a WCDMA terminal and a WiBro terminal.

As explained with reference to FIGS. 1 to 3, the integrated relay system according to one embodiment of the present invention allows the integrated relay of a mobile communication signal and an internet signal in a shadow area, such as the inside of a building, in which a RF signal is not well received. In accordance with the present invention, various kinds of signals can be transmitted to a user through one repeater, which reduces costs of producing a repeater, to overcome the conventional problems of having to install internet repeaters and mobile communication repeaters separately. In embodiments with reference to FIGS. 1 to 3, although only ERU 200-1 for WCDMA/WiFi and ERU 200-2 for WCDMA/WiBro are illustrated as a lower ERU, an ERU for WiBro/WiFi may also be applicable. In this case, the MUX 127 of UMU 100 multiplexes a WiBro signal and an Ethernet signal, not a WCDMA signal, to transmit through a UTP cable, and the ERU for WiBro/WiFi has the same configuration as ERU 200-1 for WCDMA/WiFi.

Figure 4:
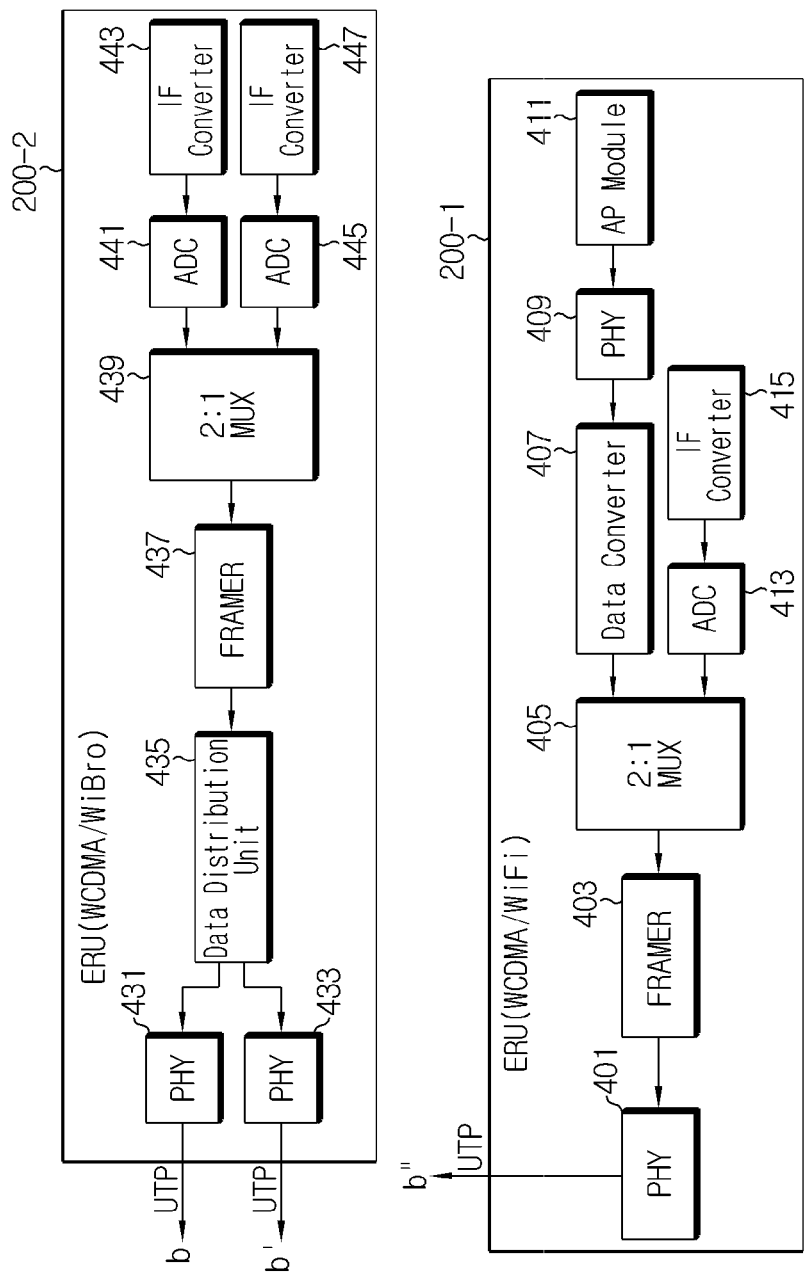
FIG. 4 shows an alternative configuration of the ERU of the integrated relay system shown in FIG. 1.
Figure 5:
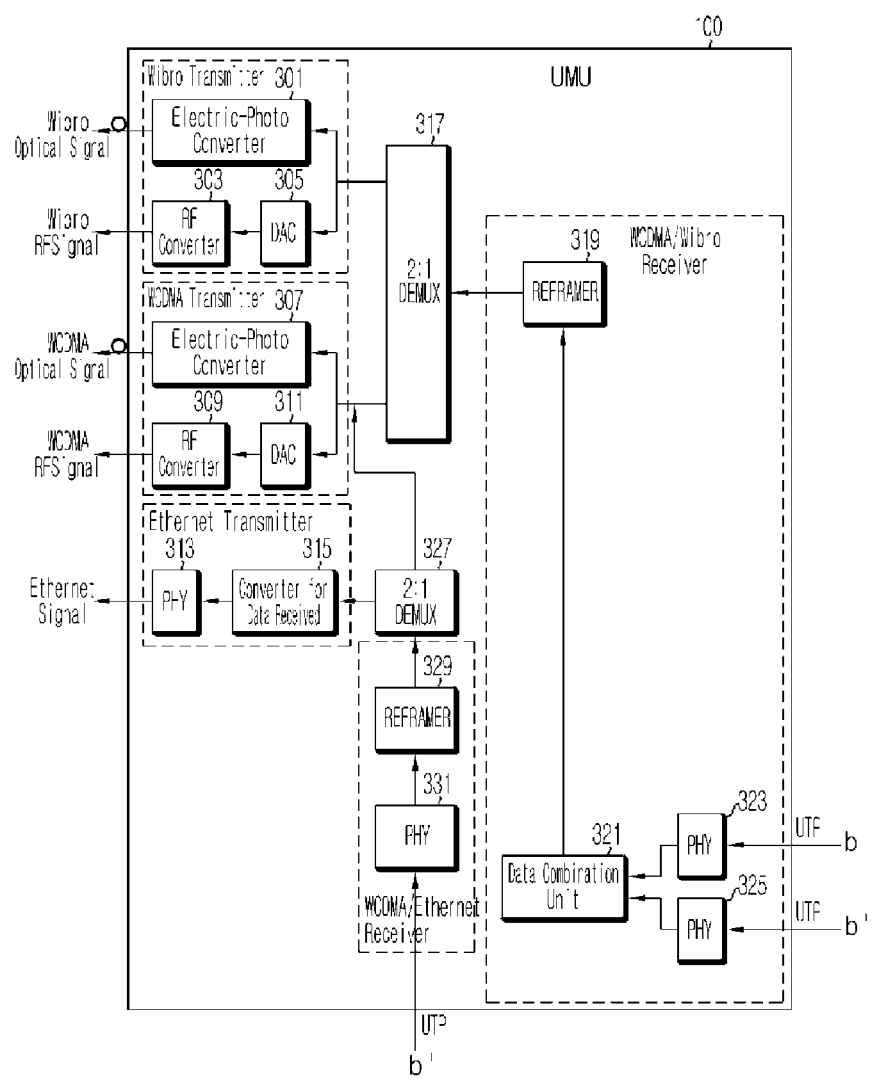
FIG. 5 shows an alternative configuration of the UMU of the integrated relay system shown in FIG. 1.

FIG. 4 shows an alternative configuration of the ERU of the integrated relay system shown in FIG. 1, and FIG. 5 shows an alternative configuration of the UMU of the integrated relay system shown in FIG. 1, where both show a process of a reverse signal which is transmitted from ERU 200-1, 200-2 to UMU 100.

Referring to FIG. 4, ERU 200-1 for WCDMA/WiFi receives a wireless LAN signal from a user terminal having a wireless LAN or a WCDMA signal from a WCDMA terminal. The wireless LAN signal transmitted from a user terminal having a wireless LAN is received by AP module 411. The wireless LAN signal received by AP module 411 is input as a 100 Mbps Ethernet signal in a physical chip 409, and the physical chip 409 converts the Ethernet signal into a digital signal to output to a data converter 407. Since the Ethernet signal should be multiplexed with the WCDMA signal, the data converter 407 converts the digital signal output from the physical chip 409 into a 50 MHz/2 bit signal to output to MUX 405. Meanwhile, a WCDMA RF signal received from a WCDMA terminal is frequency down-converted as an intermediate frequency band in IF converter 415 and then output. The WCDMA signal of an intermediate frequency band is converted into a digital signal in ADC 413 and output to MUX 405. MUX 405 multiplexes the 50 MHz/2 bit Ethernet signal output from the data converter 407 and the 50 MHz/14 bit WCDMA signal output from ADC 413 to form one signal which is output to a framer 403. The multiplexed signal formed in MUX 405 is a 50 MHz/16 bit signal. The framer 403 frame-processes the multiplexed signal to form a 125 MHz/8 bit signal and then outputs the processed signal. A physical chip 401 converts the signal output from the framer 403 into a gigabit Ethernet signal and transmits the converted signal through a UTP cable to UMU 100.

Also, ERU(200-2) for WCDMA/WiBro comprises IF converters 443 and 447, ADCs 441 and 445, MUX 439, a framer 437, a data distribution unit 435, and physical chips 431 and 433. Specifically, a RF signal transmitted from a WCDMA terminal is converted as an intermediate frequency band in IF converter 443. A RF signal transmitted from a WiBro terminal is converted as an intermediate frequency band in IF converter 447. The signals of an intermediate frequency band which are output from IF converters 443 and 447 are converted into digital signals in ADCs 441 and 445. The WCDMA digital signal and WiBro digital signal output from ADCs 441 and 445 are multiplexed in MUX 439 to form one signal. The multiplexed signal in MUX 439 is framed in a gigabit transmission format in the framer 437. The signal output from the framer 437 is distributed into two signals in the data distribution unit 435 and output to physical chips 431 and 433. Physical chips 431 and 433 converts each of the two signals into a gigabit signal and transmits each converted signal to UMU 100 through the UTP cable.

Referring to FIG. 5, each of the two physical chips 323 and 325 which are equipped in the WCDMA/WiBro receiver of UMU 100 receives a signal transmitted from ERU 200-2 for WCDMA/WiBro through a UTP cable and converts the received signal into a digital signal. Each digital signal is combined with each other to form one signal in a data combination unit 321 and output to a reframer 319. The reframer 319 reframes the signal output from the data combination unit 321 to extract a pure data signal and outputs to DEMUX 317. DEMUX 317 demultiplexes the signal output from the reframer 319 into a WiBro signal and a WCDMA signal to output to a WiBro transmitter and a WCDMA transmitter, respectively.

The electric-photo converter 301 of the WiBro transmitter converts the WiBro signal output from DEMUX 317 by using a laser diode into an optical signal and transmits the optical signal through an optical cable to an optical repeater. DAC 305 converts the WiBro signal output from DEMUX 317 into an analog signal. RF converter 303 converts the analog signal output from DAC 305 into a frequency-up analog signal and transmits the converted signal to a WiBro base station.

The photo-electric converter 307 of the WCDMA transmitter converts the WCDMA signal output from DEMUX 317 by using a laser diode into an optical signal and transmits the optical signal through an optical cable to an optical repeater. DAC 311 converts the WCDMA signal output from DEMUX 317 into an analog signal. RF converter 309 converts the analog signal output from DAC 311 into a frequency-up analog signal and transmits the converted signal to a WCDMA base station.

Referring to FIG. 5, the physical chip 331 equipped in the WCDMA/Ethernet receiver of UMU 100 receives the signal transmitted from ERU 200-1 for WCDMA/WiFi through a UTP cable and converts the signal into a 125 MHz/8 bit digital signal. The converted digital signal is reframed in the reframer 329 to extract a pure data signal and output to DEMUX 327. The signal output from the reframer 329 is a 50 MHz/16 bit signal. DEMUX 327 demultiplexes the signal output from the reframer 329 into a 50 MHz/14 bit WCDMA signal and a 50 MHz/2 bit Ethernet signal to output to a WCMA transmitter and an Ethernet transmitter. The WCDMA transmitter processes a signal as mentioned above. The converter 315 for data received, of the Ethernet transmitter, converts the 50 MHz/2 bit Ethernet signal into a 25 MHz/1 bit signal and outputs the converted signal to physical chip 313. The physical chip 313 transmits the Ethernet signal to an upper device.

Figure 6:
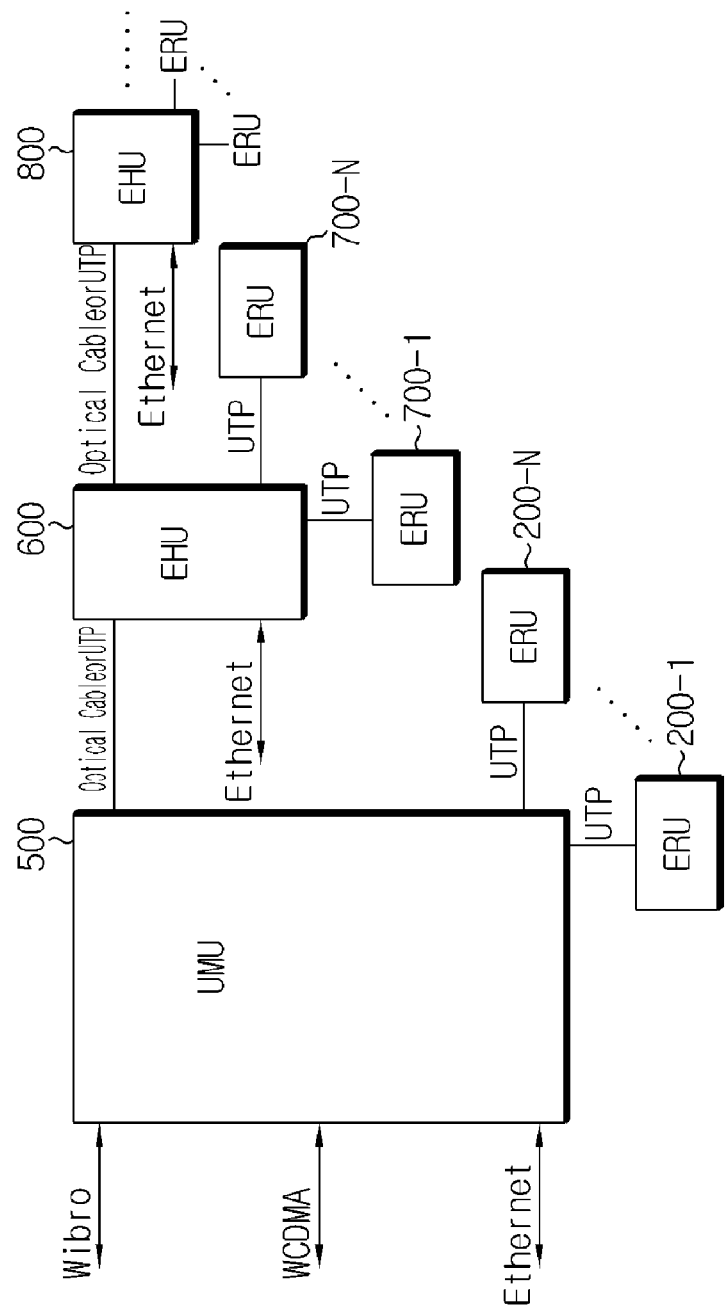
FIG. 6 shows a configuration of an integrated relay system according to another embodiment of the present invention.

FIG. 6 shows a configuration of an integrated relay system according to another embodiment of the present invention.

Unlike the integrated relay system shown in FIG. 1, the integrated relay system of FIG. 6 further comprises expansion but units 600 and 800 which is a hub repeater between the main repeater UMU 500 and the termination devices of ERUs 700-1 to 700-N. EHU 600,800 is connected to the main repeater UMU 500 and the lower EHU 600, 800 through an optical cable or a UTP cable, while being connected to the termination units of ERU 700-1 to 700-N through a UTP cable.

For example, if a complex building such as an apartment is provided with one UMU 500, each area or each layer constituting the complex building is provided with hub repeaters EHUs 600 and 800 configured to multiplex a WiBro signal and a WCDMA signal received from UMU 500 and an Ethernet signal received from an Ethernet equipment and transmits the multiplexed signal to a lower EHU or a termination unit. Similar to EHUs 600 and 800, the Ethernet equipment, FES, is installed in each area or each layer constituting the complex building as opposed to only one per complex building.

Figure 7:
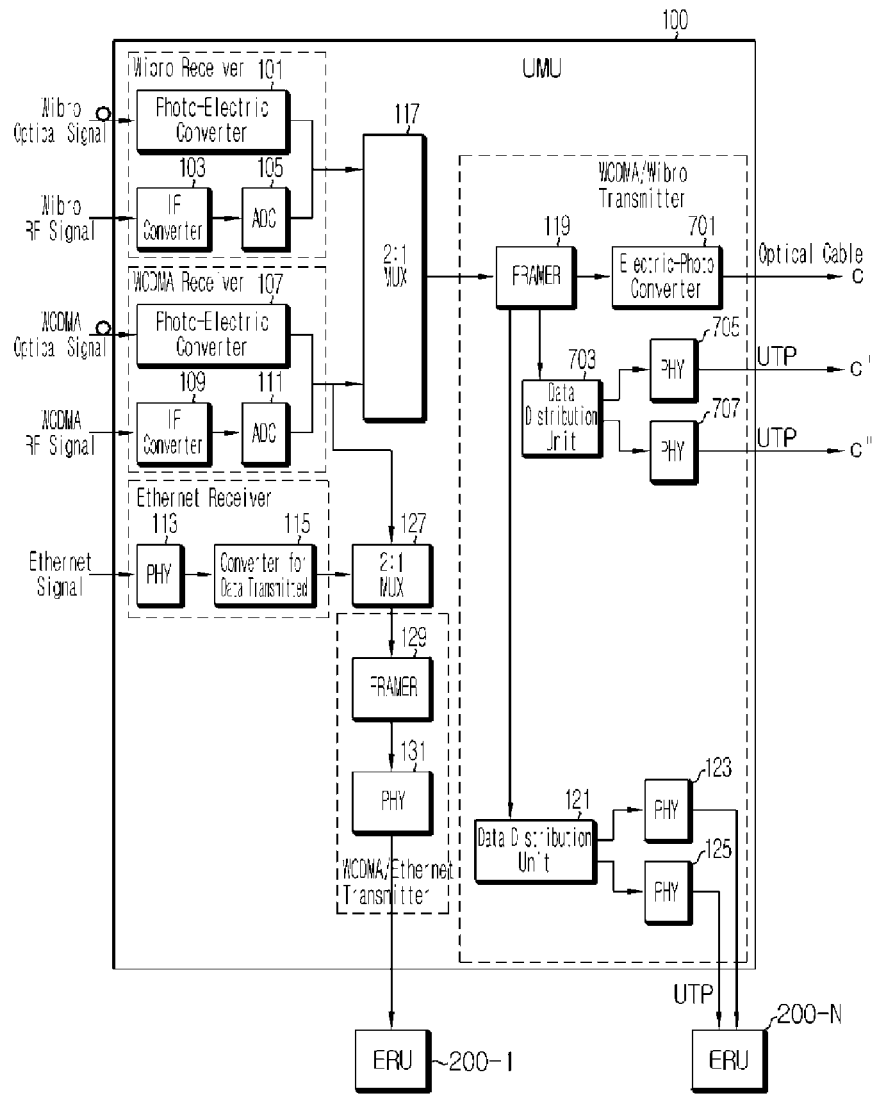
FIG. 7 shows a configuration of the UMU of the integrated relay system shown in FIG. 6.
Figure 8:
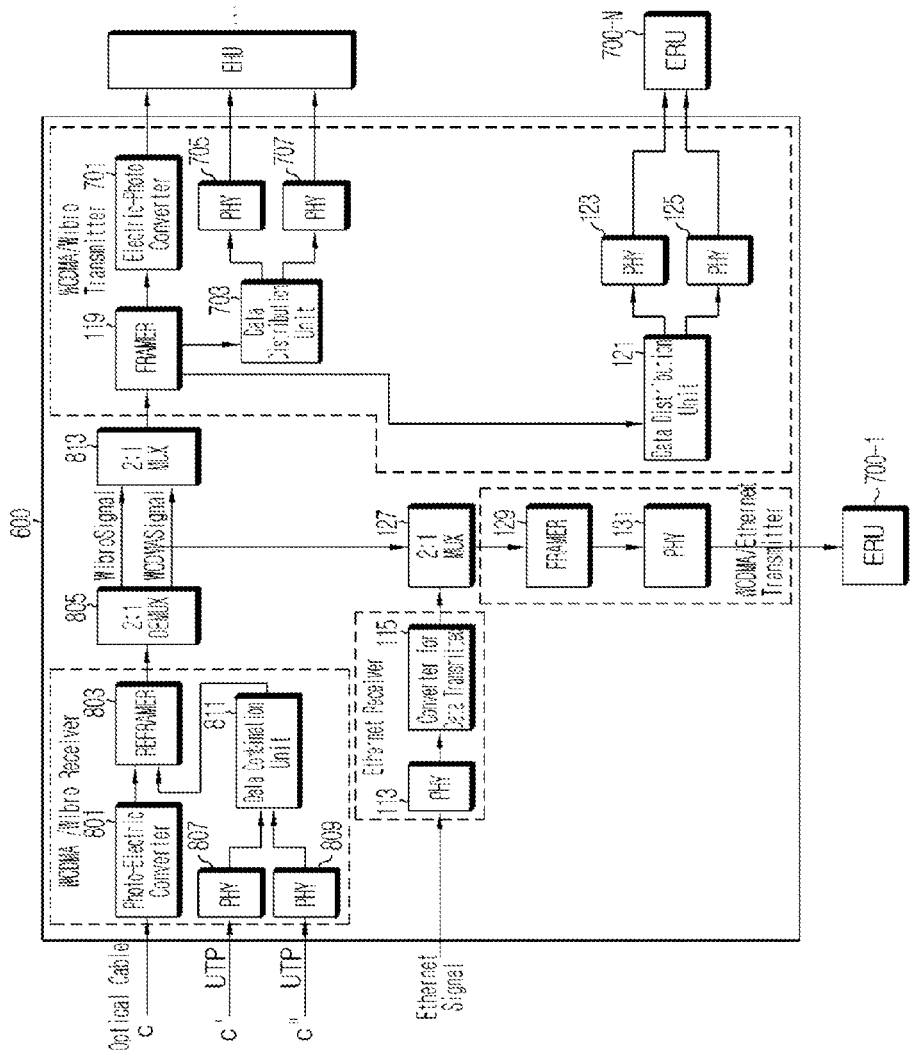
FIG. 8 shows a configuration of the EHU of the integrated relay system shown in FIG. 6.

FIG. 7 shows a configuration of the UMU of the integrated relay system shown in FIG. 6, and FIG. 8 shows a configuration of the EHU of the integrated relay system shown in FIG. 6, where both show a process of a forward signal. In FIGS. 7 and 8, the same reference numerals are regarded as indicating the elements having the same function and operation as those of FIGS. 2 and 3, and the detailed description of the same elements may be herein omitted.

In the UMU 500 of the integrated relay system shown in FIG. 7, a WCDMA/WiBro transmitter configured to transmit the multiplexed signal of a WiBro signal and a WCDMA signal to EHU 600 further comprises an electric-photo converter 701, a data distribution unit 703, and physical chips 705 and 707, unlike FIG. 2. The electric-photo converter 501 is to transmit the multiplexed signal through an optical cable to EHU 600, specifically it converts the multiplexed signal output from the framer 119 through a laser diode (LD) into an optical signal and transmits the signal through an optical cable to EHU 600. The data distribution unit 703 and physical chips 705 and 707 transmit the multiplexed signal through a UTP cable to EHU 600. The data distribution unit 703 separates the signal received from the framer 119 into two signals. Each of physical chips 705 and 707 transmits each of said two signals as a gigabit signal through a UTP cable to EHU 600. Since the capacity of the optically transmitted data signals is 2.5 Gbps or higher, while the transmission capacity of the UTP cable is less than 1 Gbps, the signals are transmitted through two UTP cables.

Referring to FIG. 8, EHU 600 comprises a WCDMA/WiBro receiver configured to receive the multiplexed signal of a WiBro signal and a WCDMA signal transmitted from UMU 500. The WCDMA/WiBro receiver comprises a photo-electric converter 801, a reframer 803, physical chips 807 and 809, and a data combination unit 811. The photo-electric converter 801 converts an optical signal into an electric signal when the multiplexed signal is received through an optical cable. The physical chips 807 and 809 and the data combination unit 811 operates when the multiplexed signal is received through a UTP cable. Each of the physical chips 807 and 809 converts the signal received from the UTP cable into a digital signal, and the data combination unit 811 combines the converted signals and outputs the combined signal to the reframer 803. The reframer 803 reframes the signal output from the photo-electric converter 801 or data combination unit 811 to extract a pure data signal and outputs the extracted signal to DEMUX 805.

The DEMUX 805 of EHU 600 demultiplexes the signal output from the reframer 803 into a WiBro signal and a WCDMA signal, and then outputs the WiBro signal and the WCDMA signal to MUX 813, wherein the WCDMA signal is also transmitted to other MUX 127. MUX 813 again multiplexes the WiBro signal and the WCDMA signal output from DEMUX 805, and the multiplexed signal is again transmitted through the lower reframer 119, electric-photo converter 701, data distribution unit 703, and physical chips 705 and 707 to a lower EHU, similar to UMU 500. That is, the WCDMA/WiBro transmitter of EHU 600 has the same configuration as the WCDMA/WiBro transmitter of UMU 500. Although it may be thought that DEMUX 805 is unnecessary since the multiplexed signals is again transmitted to a lower EHU, DEMUX 805 is used to demultiplex the WiBro signal and the WCDMA signal so that an Ethernet signal to be input in EHU 600 and a WCDMA signal to be multiplexed are separated.

The WCDMA signal separated in DEMUX 805 as mentioned above is multiplexed with an Ethernet signal in MUX 127 and then transmitted to a lower ERU 700-1 for WCDMA/WiFi. The Ethernet receiver and the WCDMA/Ethernet transmitter of EHU 600, shown in the lower part of FIG. 8, are identical to the Ethernet receiver and the WCDMA/Ethernet transmitter of UMU 500 shown in FIG. 7. Meanwhile, ERU 700-1 is identical to ERU 200-1 for WCDMA/WiFi shown FIG. 3, and ERU 700-N is identical to ERU 200-2 for WCDMA/WiBro shown FIG. 3.

That is, EHU 600 receives an Ethernet signal directly from an Ethernet equipment, and receives a WCDMA signal and a WiBro signal from an upper device, UMU 500. At this time, although UMU 500 may transmit the multiplexed signal of the WiBro signal and the WCDMA signal, and EHU 600 may transmit the multiplexed signal directly through an optical cable or a UTP cable to a lower EHU, in order to multiplex the Ethernet signal input from an Ethernet equipment and the WCDMA signal and transmit the multiplexed signal to termination units of ERU 700-1 to 700-N, the multiplexed signal received from UMU 500 is demultiplexed and then again multiplexed. Accordingly, since the lowest EHU has no further lower device, it is not required to demultiplex the multiplexed signal received from the upper EHU and then again multiplex the signals. Such a procedure may be performed under the condition that MUX 813, framer 119, electric-photo converter 701, data distribution unit 703, and physical chips 705 and 707 do not operate or in the absence thereof.

Figure 9:
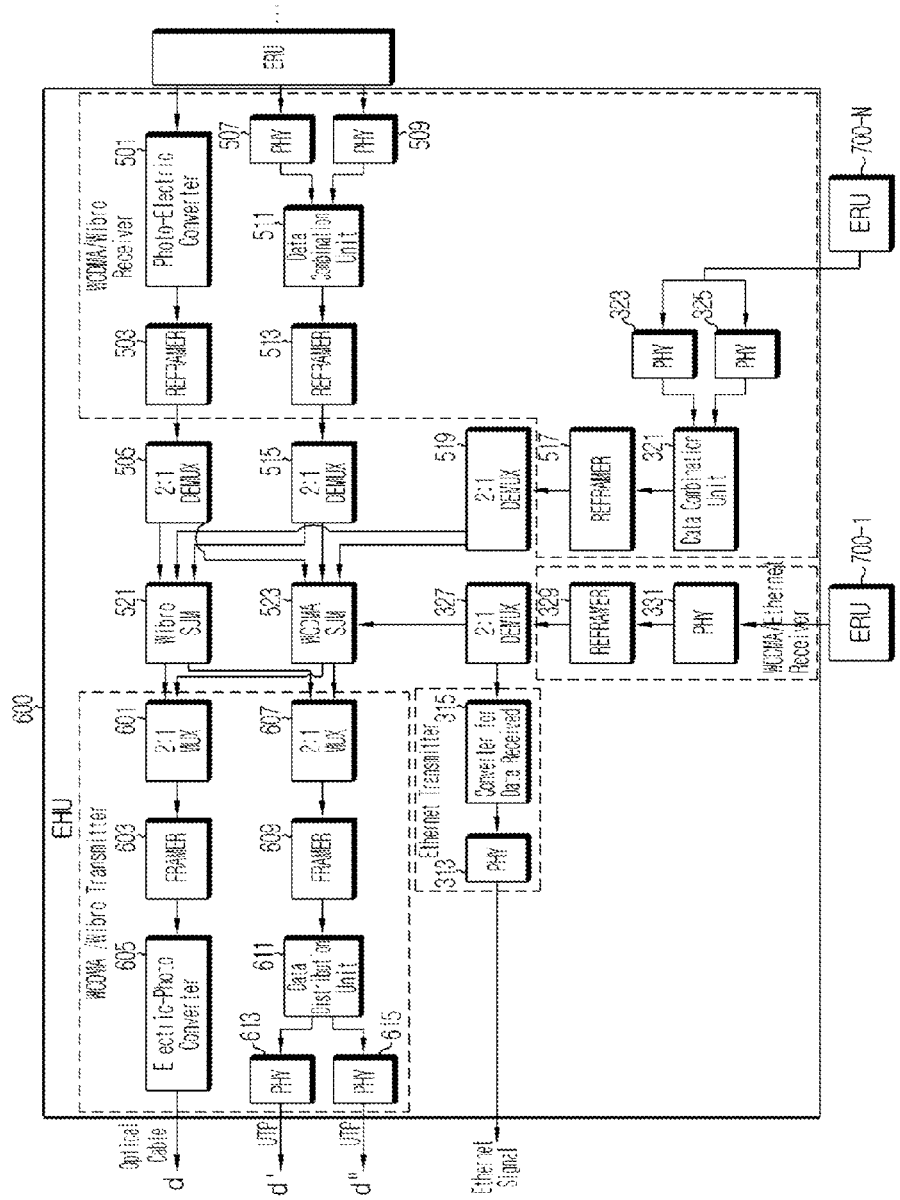
FIG. 9 shows an alternative configuration of the EHU of the integrated relay system shown in FIG. 6.
Figure 10:
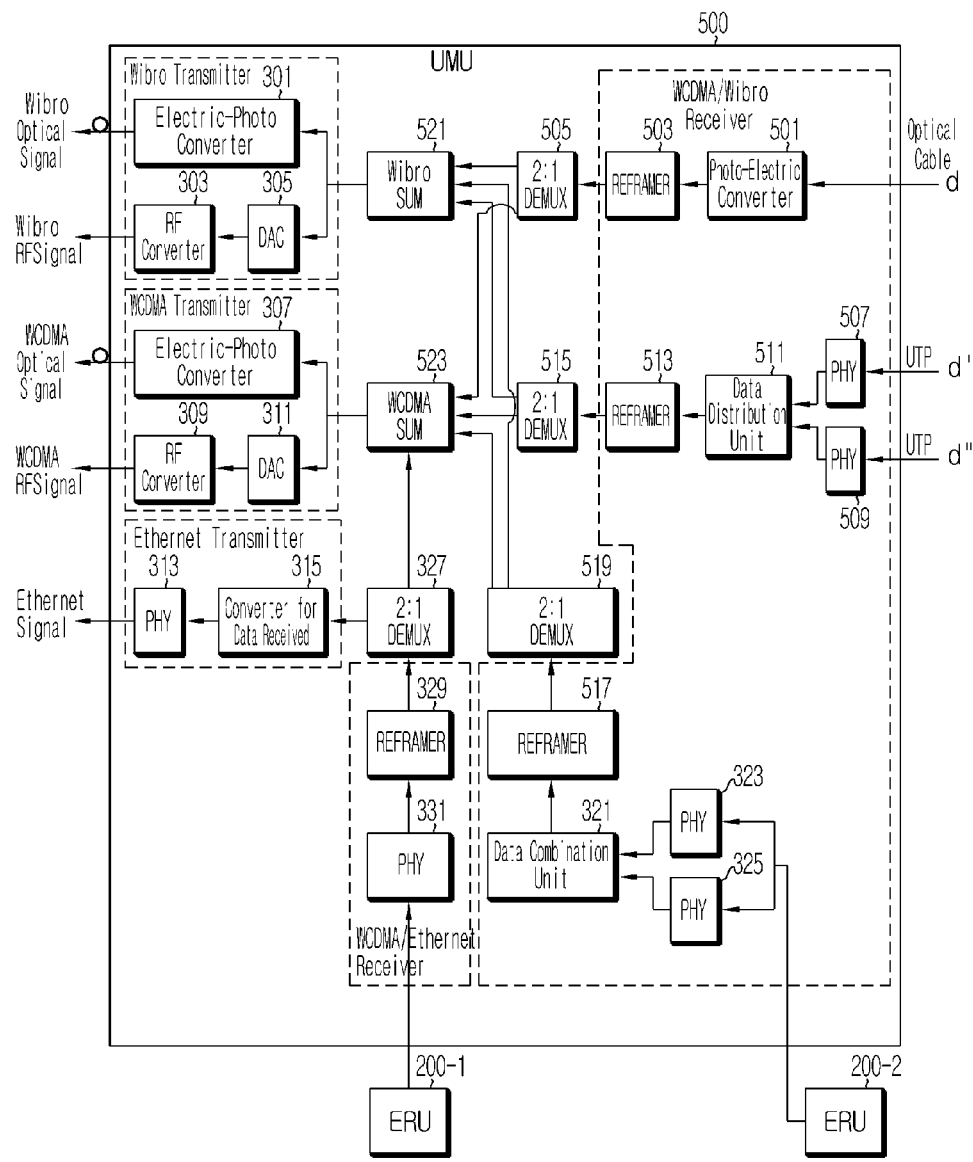
FIG. 10 shows an alternative configuration of the UMU of the integrated relay system shown in FIG. 6.

FIG. 9 shows an alternative configuration of the ERU of the integrated relay system shown in FIG. 6, and FIG. 10 shows an alternative configuration of the UMU of the integrated relay system shown in FIG. 6, where both show a process of a reverse signal. In FIGS. 9 and 10, the same reference numerals are regarded as indicating the elements having the same function and operation as those of FIGS. 4 and 5, and the detailed description of the same elements may be herein omitted.

Referring to FIG. 9, EHU 600 comprises a WCDMA/WiBro receiver configured to receive the multiplexed signal of a WCDMA signal and a WiBro signal from a lower EHU or an ERU for WCDMA/Wibro; a WCDMA/Ethernet receiver configured to receive the multiplexed signal of a WCDMA signal and an Ethernet signal from an ERU for WCDMA/WiFi; an Ethernet transmitter configured to transmit an Ethernet signal to an Ethernet equipment; and a WCDMA/WiBro transmitter configured to transmit the multiplexed signal of the WCDMA signal and the WiBro signal to an upper UMU 500.

The WCDMA/WiBro receiver of EHU 600 comprises a photo-electric converter 501 and a reframer 503 configured to receive and process an optical signal transmitted from a lower EHU. Also, the WCDMA/WiBro receiver of EHU 600 comprises physical chips 507 and 509, a data combination unit 511 and a reframer 513 configured to receive and process a UTP signal transmitted from a lower EHU. First, if an optical signal is received from a lower EHU, the photo-electric converter 501 converts the received optical signal into a digital signal which is electrically processed, and the reframer 503 reframes the digital signal to extract a pure data signal. DEMUX 505 demultiplexes the reframed signal to separate into a WiBro signal and a WCDMA signal. Meanwhile, if signals are received through two UTP cables from a lower EHU, each of two physical chips 507 and 509 converts the received signal to a digital signal, and the data combination unit 511 combines the signals to form one signal. The reframer 513 reframes the signal output from the data combination unit 511, and DEMUX 515 demultiplexes the signal output from reframer 513 to separate into a WiBro signal and a WCDMA signal.

The WCDMA/WiBro receiver of EHU 600 configured to receive a signal from ERU 700-N for WCDMA/WiBro comprises physical chips 323 and 325, a data combination unit 321 and a reframer 517, wherein ERU 700-N is identical to ERU 200-2 for WCDMA/WiBro shown in FIG. 4. Contrary to FIG. 5, the reframer 517 reframes the signal output from the data combination unit 321 to output to DEMUX 519. DEMUX 519 demultiplexes the signal output from the reframer 517 to separate into a WiBro signal and a WCDMA signal which are output to WCDMA SUM 523 and WiBro SUM 521, respectively.

Meanwhile, the WCDMA/Ethernet receiver of EHU 600 has the same configuration as the WCDMA/Ethernet receiver of FIG. 5, except for that the signal output from a reframer 329 is output to DEMUX 327 wherein the signal output from the reframer 329 is demultiplexed to be separated into a WCDMA signal and an Ethernet signal in DEMUX 327, the separated WCDMA signal is output to WCDMA SUM 523, and the separated Ethernet signal is output to the data converter 315 of an Ethernet transmitter. Specifically, a 50 MHz/2 bit Ethernet signal separated and output from DEMUX 327 is converted into a 25 MHz/1 bit signal in the converter 315 for data received and output to the physical chip 313 wherein the signal is converted into a 100 Mbps Ethernet signal and output to an Ethernet equipment.

Next, the WCDMA/WiBro transmitter of EHU 600, configured to transmit signals received from a lower EHU and ERUs of 700-1 to 700-N to the upper UMU 500, comprises MUXs 601 and 607, framers 603 and 609, an electric-photo converter 605, a data distribution unit 611, and physical chips 613 and 615. Among these, MUX 601, the framer 603 and the electric-photo converter 605 are to transmit signals through an optical cable to the upper UMU 500. MUX 607, framer 609, the data distribution unit 611, the physical chips 613 and 615 are to transmit signals through a UTP cable to the upper UMU 500.

Specifically, WiBro SUM 521 receives and sums WiBro signals separated from DEMUXs 505, 515 and 519, and outputs the signals to MUXs 601 and 607. WCMDA SUM 523 receives and sums WCDMA signals separated from DEMUXs 327, 505, 515 and 519 and outputs the signals to MUXs 601 and 607. For the process of forward signals, a unit for summing signals is unnecessary since the signals are broadcast to a lower device, but for the process of reverse signals, a unit for summing signals is necessary since the signals may be multiplied and simultaneously received from lower devices and the received signals should be transmitted to upper devices.

The signals summed in WiBro SUM 521 and WCMDA SUM 523 is each selectively output to each of MUXs 601 and 607 through a transmission line. If a signal is transmitted through an optical cable to the upper UMU 500, the signal is output to MUX 601. If a signal is transmitted through a UTP cable, the signal is output to MUX 607. In the case of transmitting through the optical cable, MUX 601 receives a WiBro signal and a WCDMA signal from WiBro SUM 521 and WCMDA SUM 523, respectively, and multiplexes the received signals, the multiplexed signal is framed in the framer 603, the framed signals is converted into an optical signal in the electric-photo converter 605 and transmitted through an optical cable to the upper UMU 500. Meanwhile, in the case of transmitting through the UTP cable, MUX 607 receives a WiBro signal and a WCDMA signal from WiBro SUM 521 and WCMDA SUM 523, respectively, and multiplexes the received signals, the multiplexed signal is framed in the framer 609, the framed signals is distributed into two signals in data distribution unit 611, the distributed signals are converted into 100 Mbps Ethernet signals in physical chips 613 and 615 and transmitted to the upper UMU 500.

The signal output from EHU 600 as mentioned above is transmitted through an optical cable or a UTP cable to UMU 500, and also the reverse signal is received from ERUs 200-1 and 200-2 which are directly connected to the UTP cable to UMU 500. Referring to FIG. 10, UMU 500 is identical to EHU 600 in terms of its partial configuration. The WCDMA/WiBro receiver of UMU 500 is identical to the WCDMA/WiBro receiver of EHU 600, and the WCDMA/Ethernet receiver of UMU 500 is identical to the WCDMA/Ethernet receiver of EHU 600. Also, DEMUXs 327, 505, 515 and 519, WCDMA SUM 523, WiBro SUM 521 and an Ethernet transmitter are identical of their corresponding parts, respectively. UMU 500 is not provided with the WCDMA/WiBro transmitter of EHU 600, but comprises a WiBro transmitter and a WCDMA transmitter, similar to FIG. 5. That is, although EHU 600 transmits a signal to UMU 500, since UMU 500 transmits a signal to a base station or optical repeater, both are different from each other when it comes to connecting to an upper device.

Specifically, UMU 500, shown in FIG. 10, comprises a WiBro transmitter and a WCDMA transmitter configured to transmit a signal to a base station or optical repeater, the WiBro transmitter converts an electric signal received from WiBro SUM 521 into an optical signal and transmits the converted signal to an optical repeater, or converts the signal into a RF signal and transmits the RF signal to a base station. Similarly, the WCDMA transmitter converts an optical signal received from WCDMA SUM 523 into an electric signal and transmits the converted signal to an optical repeater, or converts the signal into a RF signal and transmits the RF signal to a base station. An Ethernet transmitter transmits an Ethernet signal received and separated from ERU 200-1 which is a termination unit to FES which is an external Ethernet equipment.

The integrated relay system, which is explained with reference to FIGS. 6 to 10 above, further comprises EHU 600 as a hub repeater between UMU 500 as a main repeater and ERUs of 700-1 to 700-N as a termination unit. EHU 600 is connected to the main repeater UMU 500 and its lower devices, EHU 600 and 800 through an optical cable or a UTP cable, while being connected to the termination units ERUs of 700-1 to 700-N through a UTP cable. Accordingly, in various places including a large-scale complex building, a mobile communication signal and internet signal can be serviced without any fault, and such a service can be extended.

The integrated relay system of the present invention may have a fault in a WCDMA signal or WiBro signal path. Since the integrated relay system of the present invention multiplexes a WCDMA signal or WiBro signal and an internet signal before relaying, if a fault occurs in a WCDMA signal or WiBro signal path, internet services may be stopped. Accordingly, it is necessary to be able to provide internet service even if a WCDMA signal or WiBro signal fault occurs.

Figure 11:
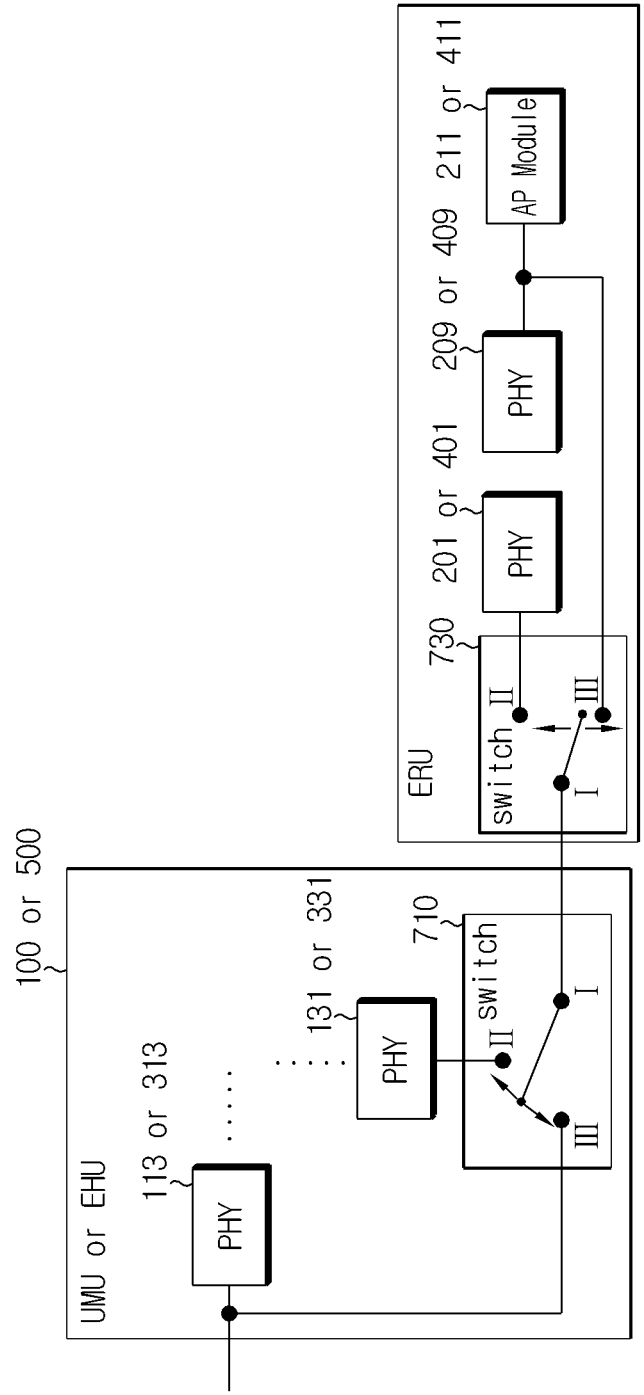
FIG. 11 shows a configuration of an integrated relay system according to another embodiment of the present invention.

FIG. 11 shows a configuration of an integrated relay system according to another embodiment of the present invention, which shows the autoswitching process of an internet signal, In FIG. 11, UMU or EHU refers to as UMU 100, 500 or EHU 600 shown in FIGS. 1 to 10, ERU refers to ERU 200-1, 700-1 shown in FIGS. 1 to 10. That is, the ERU of FIG. 11 is for WCDMA/WiFi. In FIG. 11, only components for the autoswitching of an internet signal are shown, others are not shown.

Similar to FIGS. 1 to 10, referring to FIG. 11, UMU or EHU 100 or 500 comprises a physical chip 113 or 313 configured to receive a 100 Mbps Ethernet signal from an external Ethernet equipment, FES, and converts the received signal into a digital signal; and a physical chip 131 or 331 configured to transmit the multiplexed signal of an Ethernet signal and a WCDMA signal to ERU 200-1 or 700-11. Also, ERU 200-1 or 700-1 comprises a physical chip 201 or 401 configured to receive and process the multiplexed signal of a WCDMA signal and an Ethernet signal received from UMU or EHU 100 or 500; and a physical chip 209 or 409 which is connected to an AP module 211 or 411 for a WiFi communication with a user terminal.

As shown in FIG. 11, the UMU (or EHU) and ERU of the integrated relay system according to the present invention comprises switches 710 and 730, respectively. When a WCDMA signal path normally operates, each switch 710 and 730 represents the signal path of 'I-II', while in the abnormal operation of a WCDMA signal, each switch 710 and 730 represents the signal path of 'I-III'. That is, when a WCDMA signal path is normal, an Ethernet signal and a WCDMA signal is multiplexed in UMU (or EHU) and then transmitted to ERU, or reversely a signal is received and transmitted through a reverse path. When a WCDMA signal path is abnormal, an internet signal received from an Ethernet equipment (FES) is directly transmitted to the AP module 211 or 411 of ERU, and an internet signal of a user which is received through the AP module 211 or 411 is directly transmitted to the Ethernet equipment (FES).

Thus, the integrated relay system of the present invention can prevent an internet failure by autoswitching an internet signal path when a fault occurs in a WCDMA signal path. In the autoswitching procedure, each switch 710 and 730 may be controlled in the central server of a communication company or may manually operate by itself, which is not particularly limited to its controlling method.

Figure 12:
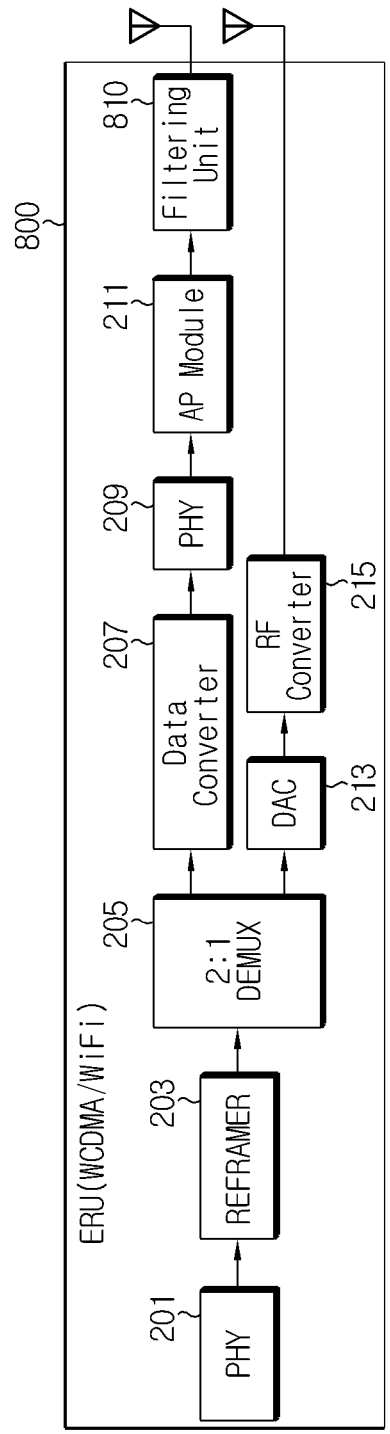
FIG. 12 shows a configuration of ERU according to another embodiment of the present invention.

FIG. 12 shows a configuration of ERU according to another embodiment of the present invention. In FIG. 12, the same reference numerals are regarded as indicating the elements having the same function and operation as those of FIG. 3, and the detailed description of the same elements may be herein omitted.

Contrary to ERU 200-1 shown in FIG. 3, ERU 800 shown in FIG. 12 further comprises a filtering unit 810. The filtering unit 810 filters a WCDMA signal which is output from a RF converter 215 and delivered through an antenna to prevent the signal from entering the AP module 211. In the case of using a plurality of communication equipments, a certain degree of isolation between the communication equipments should be ensured. If not, a signal transmitted from other communication equipment acts as an interference to deteriorate the performance of the communication equipment.

The ERU 800 according to one embodiment of the present invention offers a wireless LAN service (e.g., WiFi) and a WCDMA communication service, and thus AP module 211 which offers the wireless LAN service is located in a close distance with RF converter 215 which offers the WCDMA communication service. Accordingly, these do not have sufficient isolation with each other and act as interference for each other. In order to prevent such an interference, as shown in FIG. 12, the filtering unit 810 is adopted between AP module 211 and the antenna to filter a WCDMA signal which is output from RF converter 215 and delivered through the antenna, thereby preventing the WCDMA signal from acting as an interference in the wireless LAN service. Preferably, the filtering unit 810 may be a band pass filter which interrupts the frequency bandwidth of the WCDMA signal.

Also, ERU 800 may comprise a shielding unit for blocking an electromagnetic wave influence between components offering a wireless LAN service (e.g., substrate, electric/electronic device, and the like) and components offering a WCDMA service, although not shown. The shielding unit is interposed between components offering a wireless LAN service (e.g., substrate, electric/electronic device, and the like) and components offering a WCDMA service. The shielding unit comprises at least one of a conductive material (such as conductive carbon black, nickel, copper, iron and the like), pure iron and silicon steel, and is connected to the contact part of ERU 800.

Figure 13:
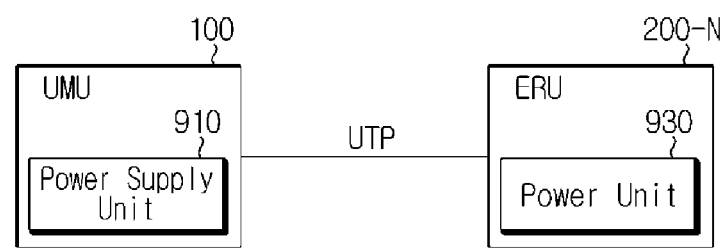
FIG. 13 shows a configuration of an integrated relay system according to still another embodiment of the present invention.

FIG. 13 shows a configuration of an integrated relay system according to still another embodiment of the present invention. As shown in FIG. 13, UMU 100 comprises a power supply unit 910, ERU 200-N comprises a power unit 930. The power supply unit 910 of UMU 100 is based on a power over Ethernet (PoE) and supplies a power through a UTP cable to the power unit 930 of ERU 200-N. The PoE technology is to supply a power and data through the existing UTP cable according to IEEE 802.3af standard. Accordingly, when ERU 200-N is installed in a complex building, it is supplied with a power from UMU 100 by means of a remote control method, with no additional power source. In FIG. 13, although a power is supplied from UMU 100 to ERU(200-N), EHU 600 may also supply a power to ERU based on PoE.

The various aspects proposed herein are just preferable examples for the purpose of illustrations only, not intended to limit the scope of the present invention. Various aspects illustrated in an individual embodiment herein are realized by a combination thereof in one embodiment. On the contrary, various aspects illustrated in one embodiment herein may be individually realized in other embodiments or in a suitable subcombination.

The present invention has been described in detail above. However, it should be understood that the detailed description, specific embodiments and the accompanying drawings are given by way of illustration only, not intended to limit the scope of the present invention, since various changes and modifications within the spirit and scope of the present invention will become apparent to those skilled in the art from this detailed description.

What is claimed is:

1. An integrated repeater which receives a multiplexed signal from a main repeater for relaying signals transmitted from upper devices, comprising:
    a demultiplexer configured to demultiplex the multiplexed signal of an Ethernet signal and a mobile communication signal received from the main repeater, and separate the signals into the mobile communication signal and the Ethernet signal;
    a first converter configured to convert the mobile communication signal separated from the demultiplexer into a radio frequency signal (RF), and transmit the converted RF signal;
    a second converter configured to convert the Ethernet signal separated from the demultiplexer into a wireless LAN signal, and transmit the converted wireless LAN signal; and
    a switching unit configured to deliver a signal received from the main repeater to either the demultiplexer or the second converter, depending on whether a fault of the mobile communication signal is generated.

2. The integrated repeater according to claim 1, which further comprises a filtering unit for filtering the radio frequency (RF) signal transmitted from the first converter to prevent the RF signal from entering to the second converter.

3. The integrated repeater according to claim 1, wherein the switching unit receives only the Ethernet signal from the main repeater and delivers the received Ethernet signal to the second converter, not through the demultiplexer, when a fault of the mobile communication signal is generated.

4. The integrated repeater according to claim 1, which is connected to the main repeater through a UTP cable installed inside a building.

5. The integrated repeater according to claim 4, which further comprises a power unit configured to be supplied with a power through the UTP cable which is connected to a LAN connecter from the main repeater.

6. The integrated repeater according to claim 1, which further comprises a shielding unit for blocking an electromagnetic wave between the first converter and the second converter.

7. An integrated relay system for the integrated relay of communication signals, comprising:
    a main device configured to receive a mobile communication signal from a mobile communication base station and an Ethernet signal from an Ethernet equipment, multiplex the mobile communication base station and the Ethernet signal to a multiplexed signal, and transmit the multiplexed signal of the mobile communication signal and the Ethernet signal; and
    a plurality of termination devices configured to be connected to the main device to demultiplex the multiplexed signals transmitted from the main device, separate the signals into the mobile communication signal and the Ethernet signal and transmit the separated mobile communication signal and Ethernet signal to a communication terminal,
    wherein the main device comprises a first switching unit configured to select either the multiplexed signal or the Ethernet signal received from the Ethernet equipment, depending on whether a fault of the mobile communication signal is generated, and
    wherein the plurality of termination devices comprise a second switching unit configured to allow the signal received from the first switching unit of the main device to be subject to a demultiplexing process or not.

8. The integrated relay system according to claim 7, wherein the plurality of termination devices further comprises a filtering unit for preventing the mobile communication signal from interfering with the Ethernet signal which is transmitted to the communication terminal.

9. The integrated relay system according to claim 7, wherein the main device and the plurality of termination units are connected to each other through a UTP cable installed inside a building.

10. The integrated relay system according to claim 9, wherein the main device further comprises a power supply unit which supplies a power through the UTP cable which is connected to a LAN connecter to the termination devices.

* * * * *